July 20, 1954
D. I. DOYLE, SR
2,684,126
DUST COLLECTOR FOR VACUUM CLEANERS, BLOWERS, AND
OTHER DUST FILTERS
Filed June 19, 1951
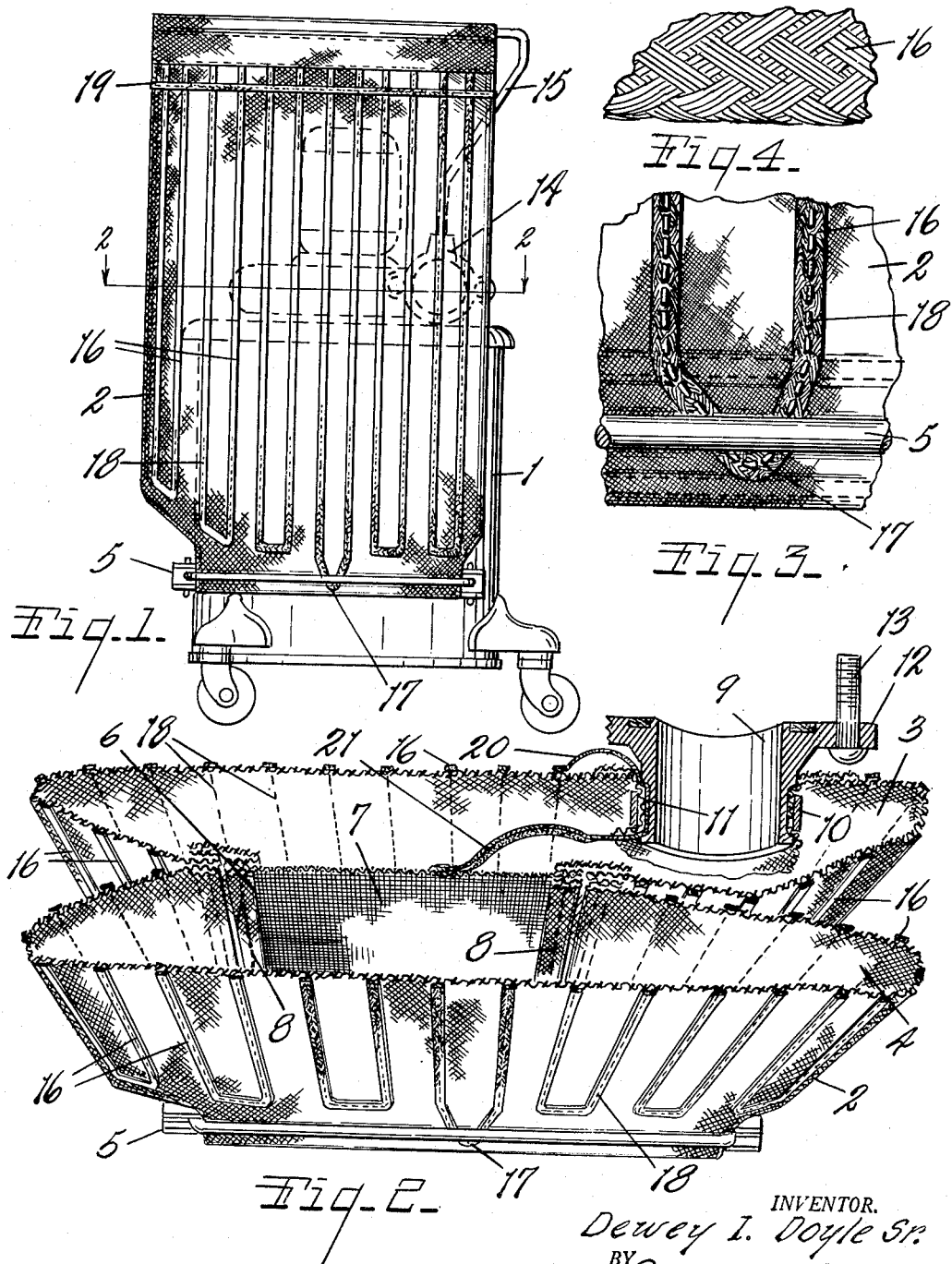
INVENTOR.
Dewey I. Doyle Sr.
BY
Otto A. Earl
Attorney.

Patented July 20, 1954

2,684,126

UNITED STATES PATENT OFFICE 2,684,126

DUST COLLECTOR FOR VACUUM CLEANERS, BLOWERS, AND OTHER DUST FILTERS

Dewey I. Doyle, Sr., Grand Rapids, Mich., assignor to Doyle Vacuum Cleaner Company, Grand Rapids, Mich.

Application June 19, 1951, Serial No. 232,292

8 Claims. (Cl. 183—51)

1

This invention relates to improvements in dust collector for vacuum cleaners, blowers and other dust filters.

The main objects of this invention are:

First, to provide a dust collector for vacuum cleaners, blowers for dust collecting systems and other dust filters which effectively eliminates the accumulation of static electricity in amounts likely to cause sparking and consequent explosion.

Second, to provide a dust collector or filter in the form of a flexible bag having electrical conductor members so arranged as to eliminate sparking such as sometimes results from an accumulation of static electricity.

Third, to provide a dust collector or filter having these advantages which may be mounted on a vacuum cleaner and is provided with flexible electrical conductors grounded in the inlet coupling member for connection to a vacuum cleaner machine.

Objects relating to details and economies of the invention will appear from the description to follow. The invention is pointed out in the claims.

A preferred embodiment of the invention is illustrated in the accompanying drawings, in which:

Fig. 1 is an elevational view of a vacuum cleaner mainly shown conventionally provided with a dust collector or filter embodying my invention.

Fig. 2 is an enlarged fragmentary perspective view on a line generally corresponding to line 2—2 of Fig. 1.

Fig. 3 is an enlarged fragmentary side elevational view.

Fig. 4 is an enlarged fragmentary view of a conductor mmeber.

Dust explosions resulting from an accumulation of static electricity in dust collectors or filters have long been recognized as an element of danger. This condition is most likely to occur under dry, cold atmospheric conditions. It is generally believed that the friction of the dust particles upon each other is responsible for or results in the generation of the static electricity, the accumulation frequently being such that a spark results with a resulting dust explosion which has on numerous occasions caused serious loss and damage. It is the main object of applicant's invention to provide a practical commercial dust collector or filter in which this danger of accumulated static electricity is eliminated or minimized or reduced below the danger point.

In the accompanying drawing 1 represents a vacuum cleaner machine, the tools or implements not being illustrated as they form no part of my present invention. The dust collector or filter designated generally by the numeral 2 is in this embodiment of my invention in the form of a bag of flexible fabric filtering material. The material is conventionally shown. Suitable flexible fabric filtering material is known to those skilled in the art.

The bag as illustrated comprises a pair of longitudinally extending compartments 3 and 4 having discharge openings at the bottom closed by the releasable clamp designated generally by the numeral 5; the clamp embracing the bottom of the bag and closing the discharge openings thereof. The particular form of clamp forms no part of my present invention. The clamp, however, is commonly formed of metal and serves as an accumulator for static electricity unless the electricity be conducted therefrom. The compartments 3 and 4 communicate with each other through an opening 6 provided with a closure 7 of woven wire screen. A copper wire screen of $\frac{1}{16}''$ mesh is found to be satisfactory.

The bag in the embodiment illustrated is formed of two pieces of fabric, the vertical edges being turned inwardly and lapped upon the edges of the screen and secured thereto as by rows of longitudinal stitches conventionally shown at 8. This turning of the edges of the pieces of fabric inwardly results in a bellows-like formation which collapses compactly and permits the expansion of the walls in use and provides more filtering area than would result without the inturned edges.

The coupling member 9 which constitutes the inlet for the filter is secured in an opening in the wall of the bag by means of a clamp 10 embracing the neck 11 of the coupling and clamping the fabric thereto. The coupling member is provided with a flange 12 receiving the bolts 13 by which it may be clamped to the outlet 14 of the vacuum cleaner. The outlet of the vacuum cleaner is provided with an upwardly projecting arm 15 demountedly receiving the filter bag for supporting it on the vacuum machine.

I secure to the wall of the bag, preferably on the outer side thereof, a plurality of reaches of flexible electrical conductors 16. These are preferably formed of multistrand braided wire arranged in the form of loops with the reaches in parallel relation. The bights of certain of the conductor members, as shown at 17 in the drawing, are extended to be engaged by the clamp 5 so that they serve as conductors to carry away the electricity that may be accumulated by the clamp. The conductor members are desirably secured to the filter wall by rows of stitches 18 extending longitudinally thereof and through the conductor members and filter wall. The reaches of the conductor members are, as stated, preferably parallel and spacings between $1\frac{1}{4}''$ to $2''$ are found to be effective. The reaches of the conductor members are connected by a header or bus member 19 which is disposed transversely thereof and secured by longitudinal stitches 18. The conductor members 16 are provided with a flexible grounding connection 20 to the coupling member 9 which constitutes a grounding connector element when it is connected to the vacuum cleaner or in operative relation to an apparatus from which the dust is to be collected such, for example, as a blower in a dust collecting system.

A flexible ground connection 21 is provided for the screen 7 to the coupling member 9. The ground connectors 20 and 21 are desirably of multistrand braided wire. Multistrand braided wire conductors have the advantage of being flexible and have a large factor of safety if one or more wires are broken as the conductors still remain effective. Also, the conductor members are flat and can be readily secured to the filtering fabric by stitching. However, other forms of electrical conductors may be used, for example single strands of copper wire, but I have found flexible multistrand conductors to be particularly advantageous. The combination with the screen which constitutes a collector and conductor with the conductor members on the walls of the bags is highly efficient in the matter of collecting and grounding the generated static electricity.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A dust collector for vacuum cleaners and the like comprising a bag of flexible fabric filtering material disposed outside of the vacuum cleaner tank, a plurality of electrical conductor members in parallel spaced relation on the outer surface of said bag and secured thereto, the distance between adjacent edges of adjacent conductors being no greater than two inches, and a grounding connection for said conductor members.

2. A dust collector for vacuum cleaners and the like comprising an elongated bag of flexible fabric filtering material, a plurality of electrical conductor members in parallel spaced relation on the outer surface of said bag and secured thereto, the distance between adjacent edges of adjacent conductors being substantially one inch, and a grounding connection for said conductor members.

3. A dust collector for vacuum cleaners and the like comprising an elongated bag of flexible fabric filtering material, a plurality of reaches of an electrical conductor secured to the outer surface of said bag and extending longitudinally thereof in spaced parallel relation, the adjacent edges of adjacent reaches of said conductor being spaced apart a maximum distance of substantially two inches, and a grounding connection for said conductor.

4. A dust collector for vacuum cleaners and the like comprising an elongated bag of flexible fabric filtering material, a plurality of reaches of an electrical conductor secured to the outer surface of said bag and extending longitudinally thereof in spaced parallel relation, the adjacent edges of adjacent reaches of said conductor being spaced apart substantially one inch, and a grounding connection for said conductor.

5. A dust collector for vacuum cleaners and the like comprising an elongated bag of flexible fabric filtering material, the outside wall of the bag extending inwardly on the opposite sides thereof to provide compartments communicating through an opening, an electrical conductor screen disposed within said opening and secured to the sides thereof, a plurality of electrical conductor members secured to the outer surface of said bag in parallel spaced relation, the adjacent edges of adjacent conductors being spaced apart a maximum distance of substantially two inches, a flexible grounding connection for said screen, and a flexible grounding connection for said conductors.

6. A dust collector for vacuum cleaners and the like comprising an elongated bag of flexible fabric filtering material, the outside wall of the bag extending inwardly on the opposite sides thereof to provide compartments communicating through an opening, an electrical conductor screen disposed within said opening and secured to the sides thereof, a plurality of electrical conductor members secured to the outer surface of said bag in parallel spaced relation, the adjacent edges of adjacent conductors being spaced apart substantially one inch, a flexible grounding connection for said screen, and a flexible grounding connection for said conductors.

7. A dust collector for vacuum cleaners and the like, comprising an elongated bag of flexible fabric filtering material, the outside wall of the bag extending inwardly on the opposite sides thereof to provide compartments communicating through an opening, an electrical conductor screen disposed within said opening and secured to the sides thereof, a plurality of electrical conductor members extending longitudinally of said bag and secured to the outer surface thereof in spaced apart parallel relation, the adjacent edges of adjacent conductors being spaced apart a maximum distance of substantially two inches, a flexible grounding connection for said screen, and a flexible grounding connection for said conductors.

8. A dust collector for vacuum cleaners and the like comprising an elongated bag of flexible fabric filtering material, the outside wall of the bag extending inwardly on the opposite sides thereof to provide compartments communicating through an opening, an electrical conductor screen disposed within said opening and secured to the sides thereof, a plurality of electrical conductor members extending longitudinally of said bag and secured to the outer surface thereof in spaced apart parallel relation, the adjacent edges of adjacent conductors being spaced apart substantially one inch, a flexible grounding connection for said screen, and a flexible grounding connection for said conductors.

References Cited in the file of this patent

UNITED STATES PATENTS

| Number | Name | Date |
| --- | --- | --- |
| 326,176 | Van Gelder | Sept. 15, 1885 |
| 1,363,753 | Quinn | Dec. 28, 1920 |
| 1,574,422 | Feind | Feb. 23, 1926 |
| 2,031,454 | Bilde | Feb. 18, 1936 |
| 2,308,682 | Fuge | Jan. 19, 1943 |
| 2,364,069 | Hahn | Dec. 5, 1944 |